US008669852B2

(12) United States Patent
Neufeglise et al.

(10) Patent No.: US 8,669,852 B2
(45) Date of Patent: Mar. 11, 2014

(54) ACOUSTIC BACKUP ALARM FOR PROVIDING ACOUSTIC AND DUAL TECHNOLOGY (ACOUSTICAL AND OPTICAL) OPERATION (75) Inventors: Steven W. Neufeglise, Rochester, NY (US); Daniel T. McCann, Union, KY (US)

(73) Assignee: Star Headlight & Lantern Co., Inc., Avon, NY (US)

( * ) Notice: Subject to any disclaimer, the term of this patent is extended or adjusted under 35 U.S.C. 154(b) by 448 days.

(21) Appl. No.: 12/927,046

(22) Filed: Nov. 5, 2010

(65) Prior Publication Data
US 2011/0102666 A1 May 5, 2011

Related U.S. Application Data (60) Provisional application No. 61/280,548, filed on Nov. 5, 2009.

(51) Int. Cl.
G08B 3/00 (2006.01)
G08B 7/00 (2006.01)
B60Q 1/26 (2006.01)
H04N 9/47 (2006.01)

(52) U.S. Cl.
USPC .................. 340/384.1; 340/391.1; 340/388.1; 340/396.1; 340/474; 340/326; 116/3; 116/137 R; 348/148; 348/151

(58) Field of Classification Search
USPC .............. 340/384.1, 391.1, 388.1, 396.1, 474
See application file for complete search history.

(56) References Cited

U.S. PATENT DOCUMENTS

| 4,603,317 A | 7/1986 | Gailbreath et al. |
| 4,689,609 A | 8/1987 | Ko et al. |
| 4,790,020 A | 12/1988 | Lin |
| 4,847,590 A | 7/1989 | Gosswiller |
| 4,851,813 A | 7/1989 | Gottlieb |
| 4,885,567 A | 12/1989 | Katz |
| 4,893,343 A | 1/1990 | Bader |
| 4,903,007 A | 2/1990 | Gottlieb |
| 4,963,855 A | 10/1990 | Kojima |
| 4,975,965 A | 12/1990 | Adamson |
| 4,994,800 A | 2/1991 | Milliken |
| 5,047,747 A * | 9/1991 | Gottlieb ................. 340/463 |
| D382,221 S | 8/1997 | Chen |
| D397,635 S | 9/1998 | Chu |
| 5,804,774 A | 9/1998 | Ford et al. |
| 5,970,158 A | 10/1999 | Beltran |
| 6,127,918 A | 10/2000 | Lin |
| 6,166,623 A | 12/2000 | Coward |
| 6,259,475 B1 * | 7/2001 | Ramachandran et al. .... 348/148 |
| D453,306 S | 2/2002 | Bekasi |
| 6,509,832 B1 * | 1/2003 | Bauer et al. ................ 340/425.5 |

(Continued)

Primary Examiner — Donnie Crosland
(74) Attorney, Agent, or Firm — Kenneth J. Lukacher Law Group (57) ABSTRACT A reflex speaker which provides an acoustic signal generator for acoustic alarm signals is captured in a housing through which the acoustic signals project via ports at the exit end of the housing. The housing defines a compartment at the exit end with an opening which is covered so that the acoustic signals project out of the exit end around the compartment. The cover may be a transparent cover which provides a lens through which optical signals generated by optics in the compartment provided by either LEDs to provide an optical warning signal, or a video camera, such as a CCD, which responds to visual signals as from hazards at the rear of the vehicle.

19 Claims, 6 Drawing Sheets (56) References Cited

U.S. PATENT DOCUMENTS

| | | |
|---|---|---|
| 6,516,076 B1 | 2/2003 | Marlin |
| D485,201 S | 1/2004 | Corrigan |
| 6,879,248 B2 * | 4/2005 | Flick ............................. 340/435 |
| D512,336 S | 12/2005 | Flick |
| D513,200 S | 12/2005 | Lai |
| 6,977,584 B2 | 12/2005 | Milliken |
| D514,010 S | 1/2006 | Corrigan |
| D514,466 S | 2/2006 | Lai |
| D514,973 S | 2/2006 | Coward |
| D516,448 S | 3/2006 | Lai |
| D518,023 S | 3/2006 | Miller |
| 7,388,479 B2 * | 6/2008 | Lee ............................. 340/463 |
| 7,617,794 B2 | 11/2009 | Chlystek |
| D615,443 S | 5/2010 | Datz et al. |
| 2005/0276432 A1 | 12/2005 | Hsieh |
| 2010/0189295 A1 | 7/2010 | Datz et al. |

* cited by examiner

SECTION VIEW A-A
FIG. 5

SECTION VIEW A-A
FIG. 6

ACOUSTIC BACKUP ALARM FOR PROVIDING ACOUSTIC AND DUAL TECHNOLOGY (ACOUSTICAL AND OPTICAL) OPERATION

Priority is claimed to U.S. Provisional Patent Application No. 61/280,548, filed Nov. 5, 2009.

The present invention relates to acoustic backup alarms which provide dual technology operation, and particularly, both acoustic and optical operation, and particularly to an acoustic alarm which may be integrated with optics to provide a backup acoustic alarm as well as optics which can provide visual warnings or respond to hazards which are visible at the rear of the vehicle. The acoustic backup alarm in which optical signal generation or detection may be incorporated, also has the feature of operating exclusively as an acoustic backup alarm if optical signal generation or detection is not desired.

Backup alarms where light sources have been combined with speakers have been proposed, but have not been integrated so as to occupy the same space or enabled to be used separately or together in a dual technology operating mode. For information on hybrid audible warning backup alarms and backup lights which have heretofore been proposed, see, for example, Gottlieb, U.S. Pat. Nos. 4,851,813, issued Jul. 25, 1989; 4,903,007, issued Feb. 20, 1990 and 5,047,747, issued Sep. 10, 1991. See also Katz, U.S. Pat. No. 4,885,567, issued Dec. 5, 1989; and Milliken, U.S. Pat. No. 6,977,584, issued Dec. 20, 2005. Reflex speakers for providing audible warnings have also been proposed. See for example, Coward, U.S. Pat. No. 6,166,623, issued Dec. 26, 2000, and U.S. patent application Ser. No. 29/313,620, filed Jan. 27, 2009, for Datz and Cronmiller and assigned to the same assignee as the present application. Reference may be had to the patents cited in the above-identified application for reflex speakers of various designs. However, such reflex speakers have not been used in a manner to selectively provide audible and optical operation in an integrated package so as to occupy the same space without interfering with each other.

Accordingly, it is the principal feature of the invention to provide a compact backup alarm having dual technology or hybrid operating modes configured so that the operation in each of the modes, acoustical and optical, are contained in the same space without interfering with each other, and when hybrid operating modes are not desired the backup alarm may have acoustical operation without the optics or it may have optical operation without an acoustical signal generator.

Briefly described, the invention is embodied in a unit having an acoustic signal generator, which may be in the form of a reflex speaker, captured in a housing so as to define at the exit end of the housing, a compartment which may contain optics for generating or responding to optical signals. The compartment may be in a hub in the housing with spokes which define passages for the acoustic signals from the speaker out of ports at the exit end thereof around the compartment. The compartment may contain optics, such as light source(s) such as one or more LEDs, and may be covered with a transparent member so as to seal the compartments and the optics therein. The optics may also be a video camera for capturing optical signals representing images which may present hazards.

The invention thus provides an acoustic signal generator in a housing which defines a compartment at the exit end thereof, whereby acoustic signals from the generator project through ports around the compartment to provide audible alarm. The compartment being preferably defined by a hub of the housing which extends to the exit end thereof and the back of the acoustic signal generator, which may be a speaker mounted in the housing and extending into the hub thereof. The outside of the compartment may be covered. The compartment may contain optics, and if so, then the cover is preferably the transparent member through which optical signals may pass. The cover may be a lens via which optical signals are either transmitted from a light source, such as one or more LEDs (or LED array) mounted in the compartment, or optical signals are received by a video camera, or CCD, in the compartment which captures images through such lens which may represent hazards at the rear of the vehicle when the vehicle moves in the reverse or backup direction. The images captured on electronics (circuit board) in the unit may be sent elsewhere in the vehicle as typical of a backup camera, such as to a display viewable to the vehicle driver. In this manner, both acoustic and visual warning signals may be simultaneously provided in a compact unit when the vehicle, on to which the housing is mounted, is backing up, or audio signals are generated and images of rear of vehicle captured simultaneously in such compact unit.

If the dual technology, acoustic and optical facilities, is not required, the optics described above are not provided and the compartment may be covered so as not to interfere with the projection of sound from the speaker via passages from a reflector which communicates with the passages, the speaker then operating in a reflex mode.

The foregoing and other objects, features and advantages of the invention will become more apparent from a reading of the following description in connection with the accompanying drawings in which.

Figure 14:
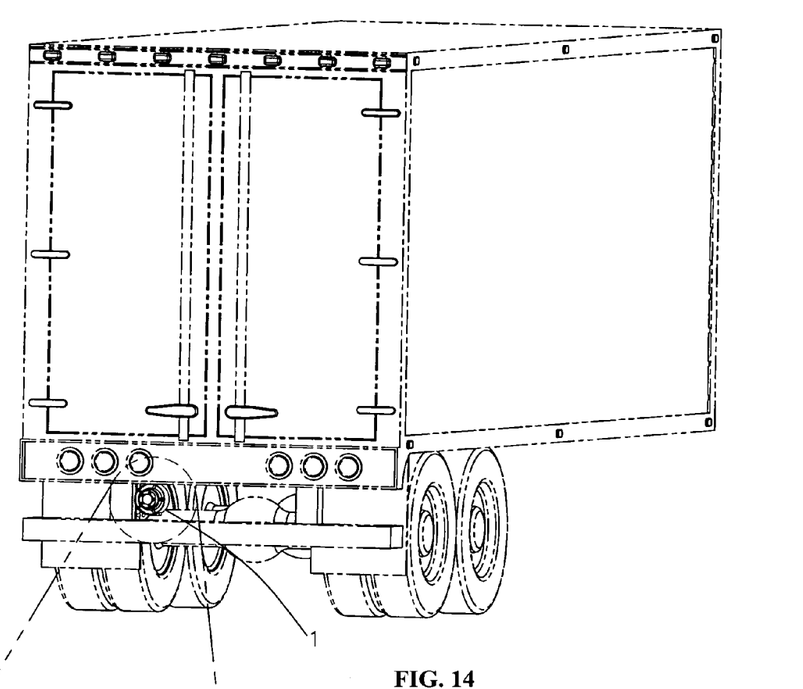
FIG. 14 is a fragmentary perspective view of the rear of a vehicle, namely and truck trailer, showing the installation of the backup alarm of FIG. 1 thereon, the truck trailer being depicted in dash lines.
Figure 15:
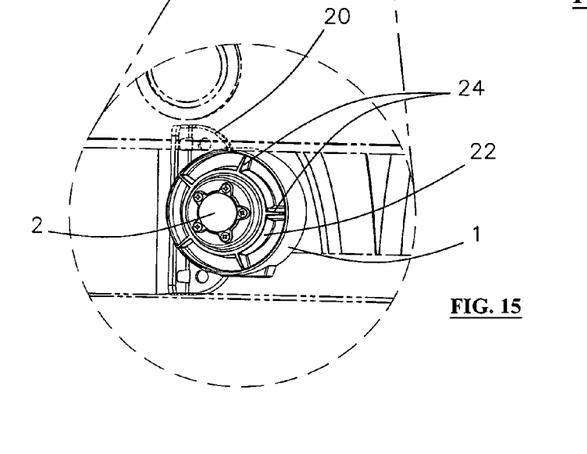
FIG. 15 is an enlargement of the portion of FIG. 14 shown within the dashed line circle in FIG. 14.

Referring more particularly to FIGS. 1-10 of the drawings, there is shown a backup alarm having dual technology, acoustic and optical, signal generating capability contained in a housing 1, the housing 1 having a mounting bracket 20 to enable the unit to be mounted, for example, at the rear of a vehicle, such as a truck or trailer, as shown for example in FIGS. 14-15. The housing has at the front end 26 thereof, a hub 22 from which spokes 24 extend to acoustic signal output ports at the front end 26 of the housing. Inside the housing 1 is an acoustic signal generator provided by a speaker 14 and a sound reflector 11, which defines with the speaker a reflex speaker. The housing 1 and reflector 11 may be injected molded plastic (e.g., polycarbonate) parts. The speaker 14 may be of the type which is commercially available and includes a diaphragm which drives the acoustic signals (sound) against the reflector 11 and then out through passages 28 between the spokes so that the sound emanates and projects from the exit ports at the front end 26 of the housing 1. The speaker 14 is seated along the outer periphery thereof against an edge 30 at the bottom of the hub 22 and is engaged by posts 32 extending from the reflector 11.

Figure 11:
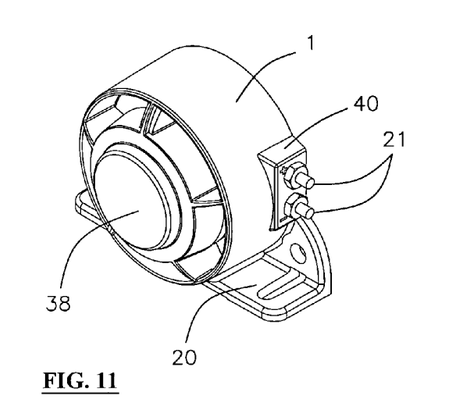
FIGS. 11, 12 and 13 are perspective views from the front of the acoustic alarm where the lens is replaced with a cover and optics is not provided in the compartment of the housing at the front, exit end thereof, the views showing different connections to the speaker, including, in FIG. 12 a connection for wiring similar to that shown in FIGS. 1, 2 and 3.
Figure 12:
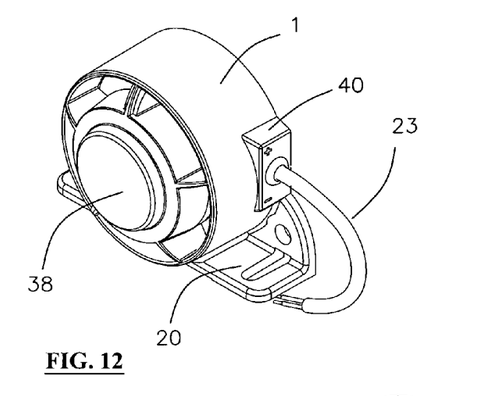
Figure 13:
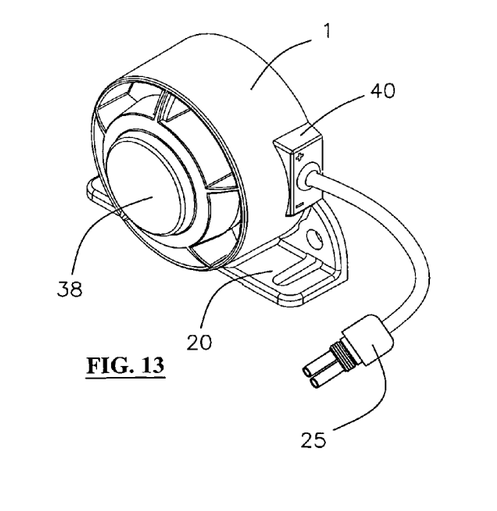

The back end 34 of the speaker 14 defines in the housing 1 and particularly the hub 22 thereof, a compartment. This compartment may contain the optics of the dual technology unit and particularly, light source(s), one or more LEDs 6 of the optics, which may represent an LED array. When only acoustic signal generation is desired, the compartment may be closed with a cover 38 as shown in FIGS. 11-13.

A circuit board 12, to which the speaker 14 is connected by a wire 17 and the LEDs 6 are connected via wires 18 (see FIG. 8), is mounted on posts 13 extending rearwardly from the sound reflector 11. Components, which operate the speaker 14 and may include a flasher for the LEDs 6, are mounted on the board 12. The board 12 is connected by power wires 5 which extend through a wire grommet 4 in a wiring box 40 on the housing 1. The wires 17 and 18 extend through a passage 42 in the upper one of the spokes 24 to the board 12.

Figure 1:
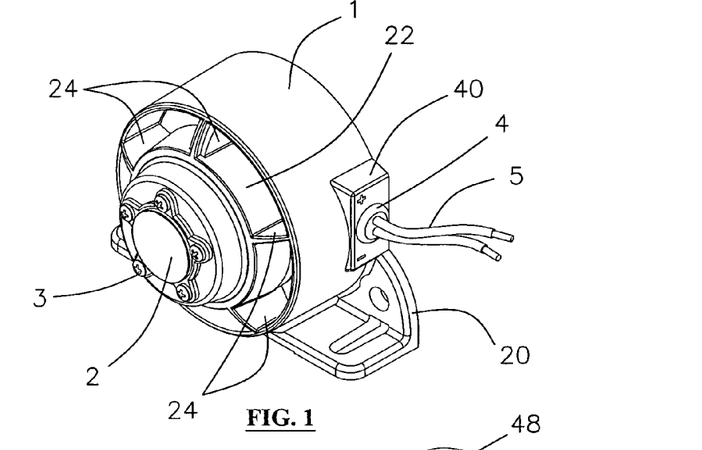
FIG. 1 is a perspective view looking downwardly from the right toward the front thereof of an acoustic backup alarm having optics for providing illumination and particularly visible warning as well as acoustic signals providing audible alarms from the front of the unit.
Figure 2:
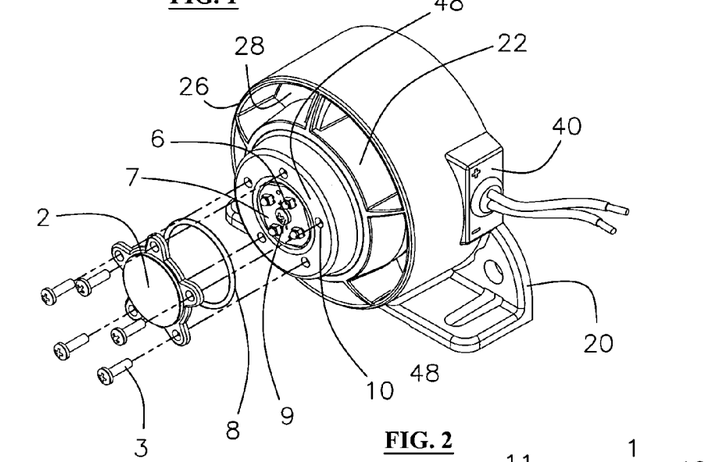
FIG. 2 is a perspective view similar to FIG. 1 with parts of the optics in exploded relationship.
Figure 3:
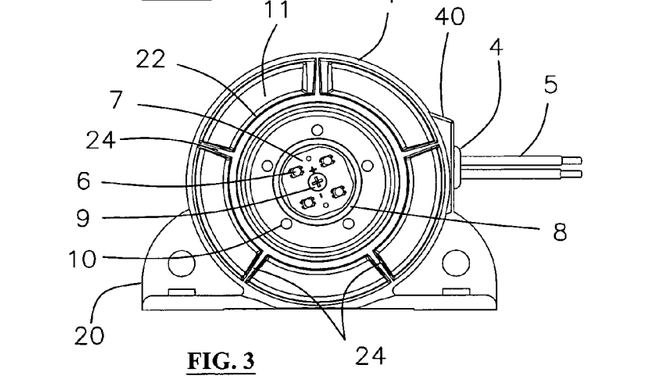
FIG. 3 is a front elevation of the backup alarm shown in FIGS. 1 and 2 with the optical lens removed.
Figure 4:
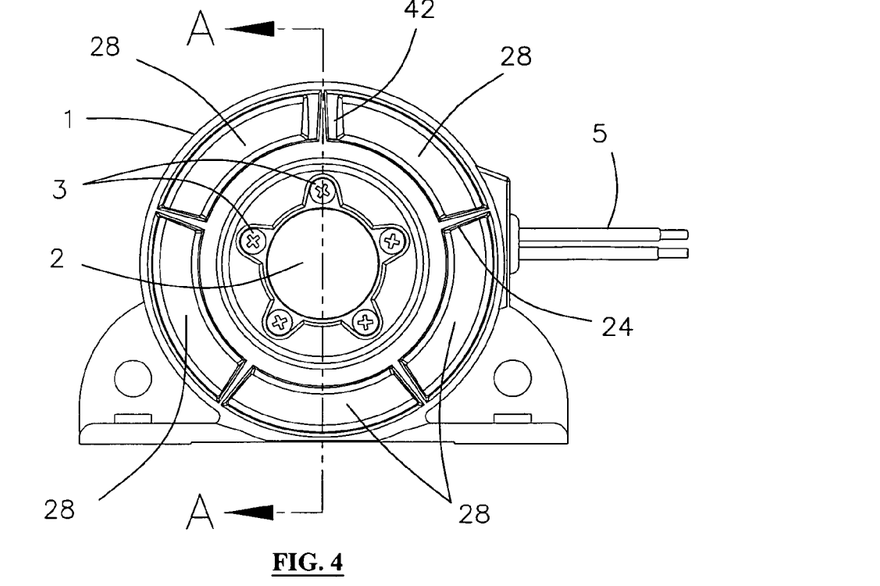
FIG. 4 is a view similar to FIG. 3 with the optical lens assembled.
Figure 5:
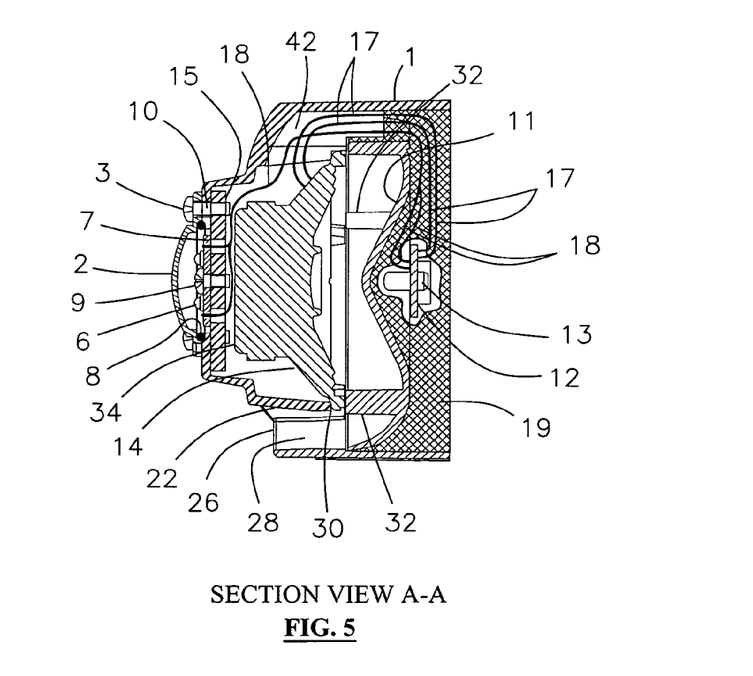
FIG. 5 is a cross-sectional view of the alarm unit taken along the line A-A in FIG. 4 when viewed in the direction of the arrows at the ends of the line A-A.
Figure 6:
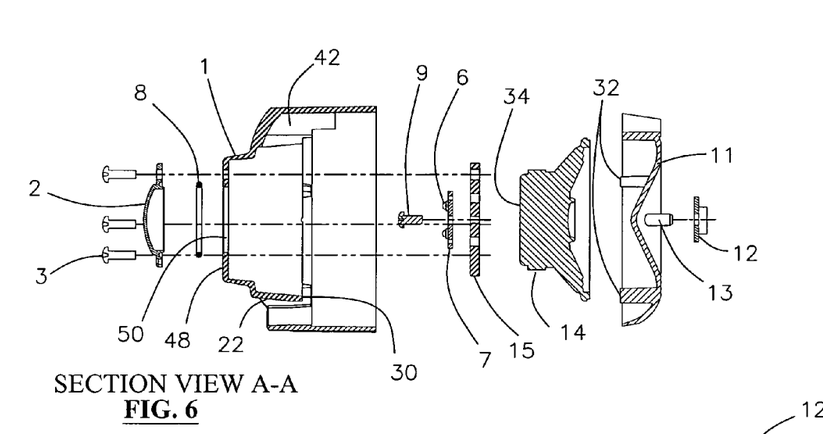
FIG. 6 is an exploded view end section of the parts of the alarm shown in FIG. 5, the section being along the line A-A in FIG. 4.
Figure 7:
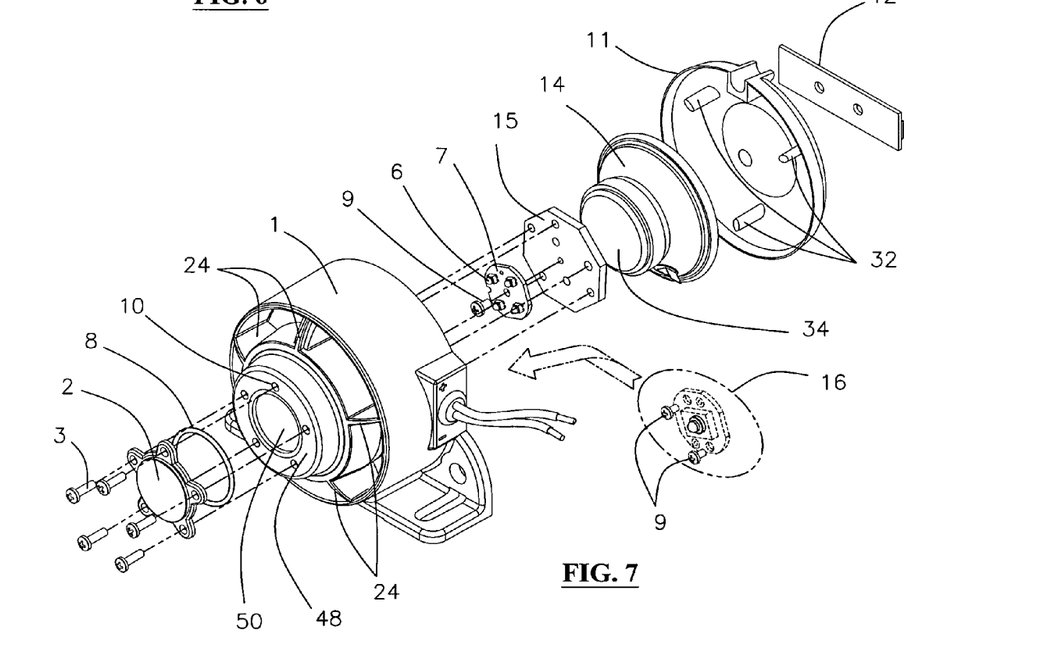
FIG. 7 is a perspective exploded view of the parts of the alarm shown in FIGS. 1-6, and illustrating optics of different types which may be used in the alarm.
Figures 8, 9, 10:
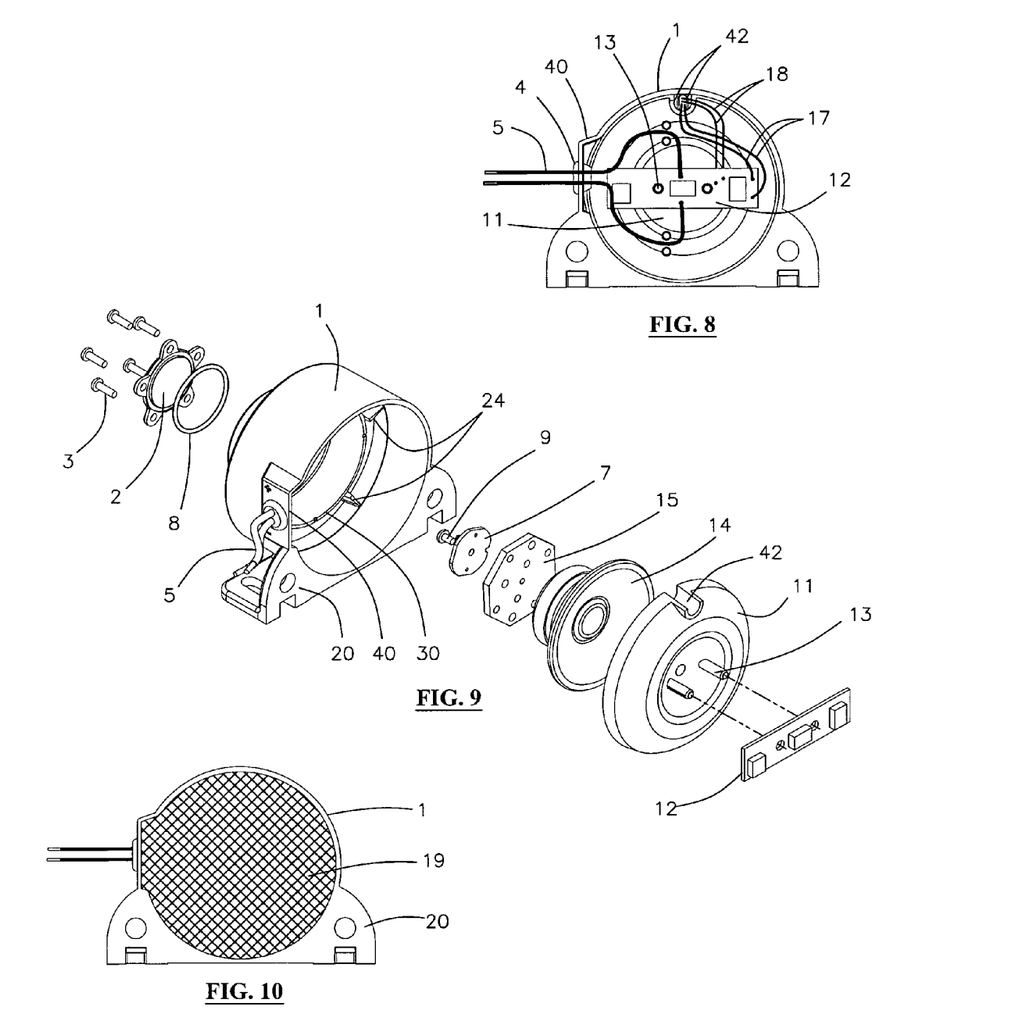
FIG. 8 is an elevational view taken from the rear of the alarm shown in the previous figures and illustrating wiring therein.
FIG. 9 is a perspective exploded view of the parts of the alarm shown in the previous figures but taken from rear end thereof.
FIG. 10 is a rear view of the alarm similar to FIG. 8, but showing the filling of the rear end of the housing with a potting material, preferably a sealing epoxy.

As shown in FIGS. 5 and 10, the rear of the housing 1 is sealed with epoxy resin (a hardened potting compound) to secure the components in the housing and particularly hold the speaker 14 and its reflector 11 in place.

The optics are provided by either the LED circuit board 7 on which the LEDs 6 are mounted or a CCD camera 16 (FIG. 7) on its circuit (or camera) board. The circuit board 7 or the camera board is attached to a mounting plate 15 by screws 9. The mounting board is attached to the upper end of the hub 22 by screws 3 which extend through holes 10 in a rim 48 which defines the upper end of the hub. The LEDs 6 may project through an opening 50 in the rim 48.

The cover for the compartment is provided by a clear (or optically transparent) member in the form of a lens 2. The lens 2 has ears through which the screws 3 project and then through holes 10 and into the mounting plate 15 thereby clamping the assembly including the mounting plate to the rim 48 of the housing 1. The lens 2 may provide a condensing or collimating function so that the visible light is in the form of a beam or may dispense the light from the LEDs 6 so as to provide a wide angle of coverage of illumination from the unit. An O-ring 8 provides a lens sealing gasket which seals the compartment under the lens 2. The circuit board 7 is connected to the mounting plate 15 with a fastener 9 so that the unit is securely assembled and protected against infiltration of water or shocks and vibration.

FIGS. 11, 12, and 13 show different types of connections to the box 40 on the housing 1, namely screw stubs 21, a cable 23, or a cable with a connector 25.

The compartment under the cover at end 26 (provided by lens 2 or cover 38) thus in one alarm mode (dual acoustical and optical operation) at least one of a camera 16 or one or more light sources 6 enabling optical operation in which the cover 2 is optically transparent to allow such optical operation. In another mode (acoustical only), the compartment may be provided without any such component(s) enabling optical operation. The passages 28 for acoustic signal(s) extend to exit ports that curve or arc (such as in a ring) around the cover (provided by lens 2 or cover 38) and the compartment there under, such as shown for example in FIG. 3, 4, or 11-13.

From the foregoing description, it will be apparent that there has been provided an improved acoustic backup alarm generator having the capability of providing dual technology operation when desired. Variations and modifications in the herein described alarm unit, within the scope of the invention will undoubtedly suggest themselves to those skilled in the art. For example, the lens 2 and cover 38 may be separate members as shown or integrated with the housing as by being molded therewith as by a manufacturing method may be to "over mold" an optical lens or cover 38 members onto the housing making it an integrated one piece unit, i.e., the opaque housing is molded first and then put into another mold in which clear plastic is injected forming the lens. The heat of the new plastic and mechanical linking causes it to melt and adhere to the housing providing a two color sealed unit. Thus, the terminology "member" may include integrated or separate parts. Accordingly, the foregoing description should be taken as illustrative, and not in a limiting sense.

What is claimed is:

1. An acoustic alarm which comprises:
an acoustic signal generator;
a housing in which said generator is mounted which direct sound around said generator out of an exit end of said housing;
a compartment in said housing between said generator and said exit end configured for storing one or more optical elements;
a member covering said compartment on said exit end; and
ports disposed in at least a 180 degree arc around said member in said exit end through which said acoustic signals project.

2. The alarm according to claim 1 wherein said arc is 360 degrees.

3. The alarm according to claim 1 further comprising the one or more optical elements in said compartment, wherein said member is of material optically transparent to optical signals transmitted or received by said one or more optical elements.

4. The alarm according to claim 3 wherein said member is a lens via which said optical signals pass.

5. The alarm according to claim 1 wherein the generator comprises a speaker having a back end which also defines said compartment.

6. The alarm according to claim 5 wherein said speaker is a reflex speaker driving sound against a reflector in said housing.

7. The alarm according to claim 5 wherein said housing has a hub, and said compartment is in said hub, and said hub comprises a plurality of spokes defining passages from said speaker to said ports.

8. The alarm according to claim 6 further comprising a circuit board disposed in said housing behind said reflector, and potting material which captures said reflector and said circuit board in said housing.

9. The alarm according to claim 3 wherein said one or more optical elements comprises one or more light sources mounted in said compartment, and said member encloses said one or more light sources therein.

10. The alarm according to claim 3 wherein said one or more optical elements comprises an electronic camera, captured in said compartment under said member.

11. The alarm according to claim 1 wherein said ports are each along a different portion of said arc around said member.

12. The alarm according to claim 11 wherein said arc is greater than 180 degrees, and said arc is along a circular curve.

13. A device providing an alarm capable of acoustic operation or both acoustical and optical operation comprising:
   means for generating an acoustic signal;
   means for covering a portion of one end of said device;
   means for directing said acoustic signal from said one end of said device out of an uncovered another portion of said device which curves around said covering means in at least a 180 degree arc; and
   a compartment within said device disposed under said covering means, wherein in one mode said compartment has optical means and said covering means is part of said optical means for enabling operation of said optical means, and in another mode said device is provided without said optical means in said compartment.

14. The device according to claim 13 wherein said optical means is at least one of a camera or one or more light sources.

15. The device according to claim 13 wherein in said one mode said covering means comprises a lens.

16. A method providing a device for generating an alarm capable of acoustic operation or both acoustical and optical operation, said method comprising the steps of:
   generating an acoustic signal;
   covering a portion of one end of said device with a cover;
   directing said acoustic signal from said one end of said device out of an uncovered another portion of said device which curves around said cover in at least a 180 degree arc; and
   providing a compartment disposed under said cover capable of having at least one of a camera or one or more light sources to enable optical operation of the device, and said covering step provides said cover which is optically transparent to said camera or said one or more light sources when present in said compartment.

17. A device providing an alarm comprising:
   an acoustic signal generator;
   passages for directing said acoustic signal from said generator to exit ports; and
   a compartment configured to store one or more optical elements representing at least one of a camera or one or more light sources, wherein said exit ports extend along an arc that curves entirely around said compartment.

18. The device according to claim 17 further comprising a housing having a hub, and spokes around said hub which define said passages and said exit ports, wherein said compartment is provided along the front of said hub, and said acoustic generator is mounted in said housing along the back of said hub.

19. The device according to claim 17 further comprising an optically transmissive cover over said compartment.

* * * * *